Figure 1:
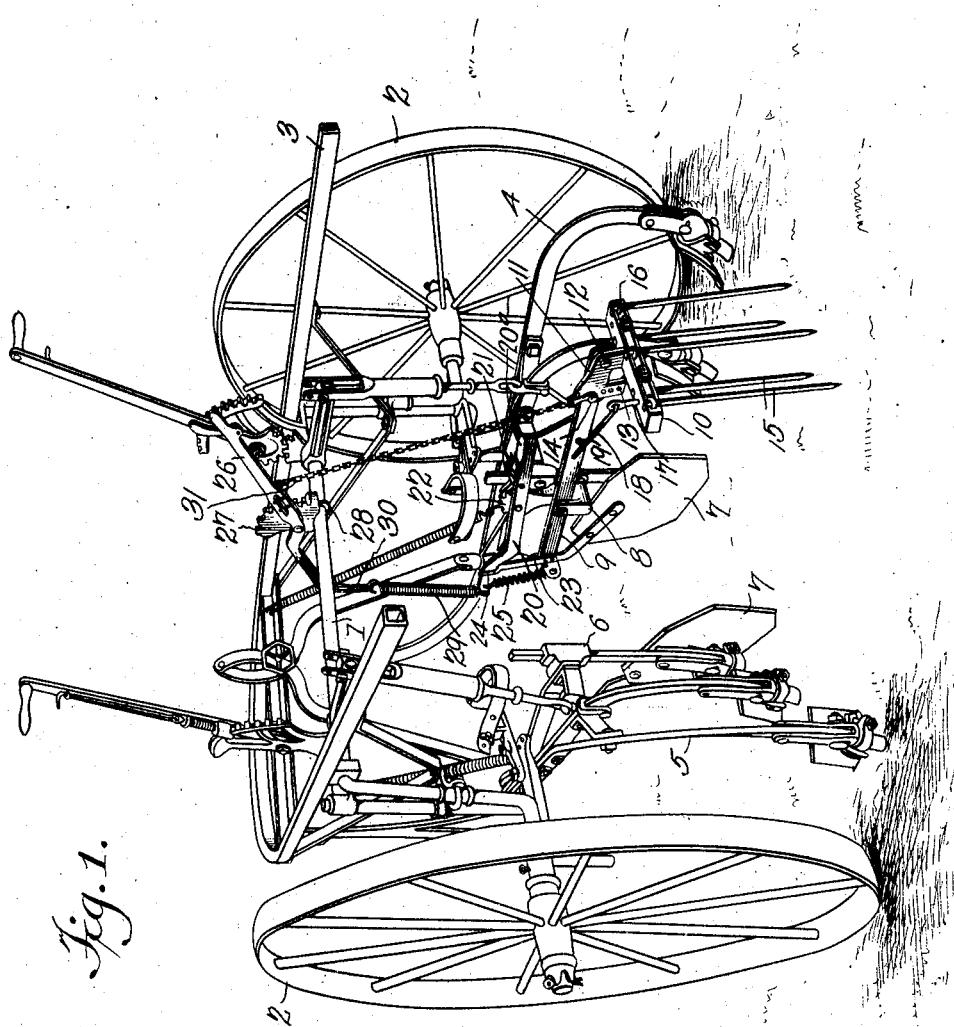

No. 761,793. PATENTED JUNE 7, 1904.
R. TITUS.
CULTIVATOR ATTACHMENT.
APPLICATION FILED JUNE 6, 1903.

NO MODEL. 2 SHEETS—SHEET 1.

Witnesses
E. F. Stewart
Wm. Bagger

Richard Titus, Inventor,
by C. A. Snow & Co.
Attorneys

No. 761,793. PATENTED JUNE 7, 1904.
R. TITUS.
CULTIVATOR ATTACHMENT.
APPLICATION FILED JUNE 6, 1903.
NO MODEL. 2 SHEETS—SHEET 2.
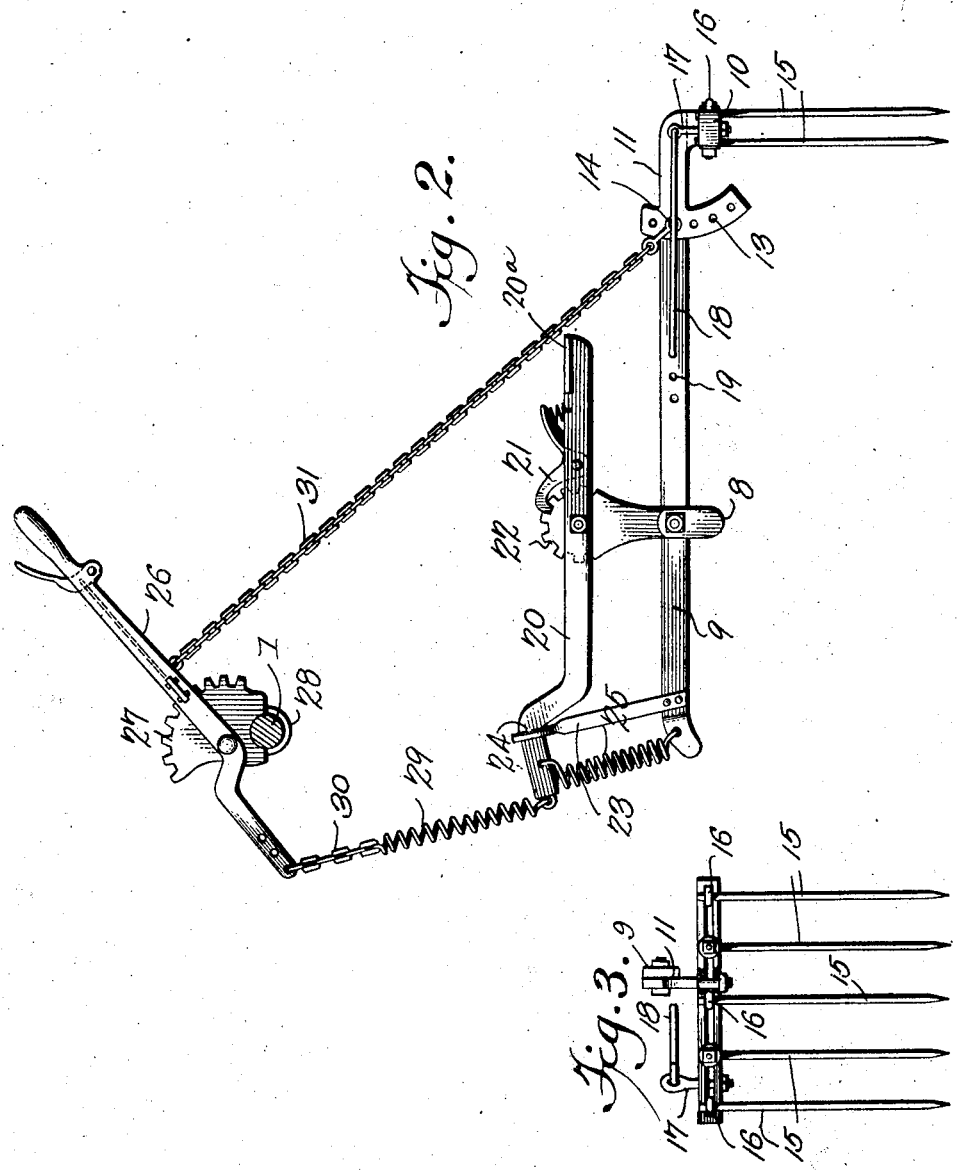
Witnesses
E. F. Stewart
Wm. Ragger
Richard Titus, Inventor,
by C. A. Snow & Co
Attorneys No. 761,793. Patented June 7, 1904.

UNITED STATES PATENT OFFICE.

RICHARD TITUS, OF BOWLING GREEN, OHIO, ASSIGNOR OF ONE-THIRD TO WILLIAM KELLER, OF BOWLING GREEN, OHIO.

CULTIVATOR ATTACHMENT.

SPECIFICATION forming part of Letters Patent No. 761,793, dated June 7, 1904.

Application filed June 6, 1903. Serial No. 160,412. (No model.)

*To all whom it may concern:*

Be it known that I, RICHARD TITUS, a citizen of the United States, residing at Bowling Green, in the county of Wood and State of Ohio, have invented a new and useful Cultivator Attachment, of which the following is a specification.

This attachment relates to attachments for cultivators which are usually known as "weeders," and the object of which is to remove the weeds growing close to the young plants or spears and also to remove or to crush such lumps or clods as may have been thrown over the spears and which, if not removed, would destroy the young plants or check their growth.

My present invention has for its object to provide a device of this class which shall be simple in construction and easily operated and which may be readily attached to any riding-cultivator of ordinary construction, in which the said weeding attachment may be positively controlled by the operator, in which said weeding attachment shall automatically yield to any obstructions in the ground in the nature of stones, roots, or the like, which would otherwise check the progress of the device or cause breakage, and in which the said attachment may be adjusted to various positions, according to the crop and soil conditions, whereby the work on hand shall be performed in the most thorough and efficient manner.

With these and other objects in view, which will appear as the nature of my invention is better understood, the said invention consists in the improved construction, arrangement, and combination of parts, which will be hereinafter fully described, and particularly pointed out in the claims.

In the accompanying drawings, Figure 1 is rear perspective view of a cultivator to which my invention has been applied in operative position, the seat and certain parts of the frame having been removed in order that my invention may be more clearly understood. Fig. 2 is a side elevation on a larger scale of my invention detached. Fig. 3 is a sectional elevation showing in detail the tooth-bar of the device.

Corresponding parts in the several figures are indicated by similar numerals of reference.

In Fig. 1 of the accompanying drawings my invention has been shown applied to an ordinary riding-cultivator, of which 1 designates the arched axle, 2 2 the wheels, and 3 the frame. The right and left hand cultivator-gangs 4 5 are supported in the frame in the usual well-known manner and form no part of my invention. In the present instance, however, the cultivator-gangs are of that type in which the inner cultivator-standards are mounted to slide vertically in castings or brackets 6, secured to the gang-frames. Said inner standards are provided with shields or fenders, which while they are no part of the invention have been shown, for the reason that they are usually employed when young corn is to be subjected to the action of the cultivator and this being the stage of growth when my improved weeding attachment is most commonly and advantageously employed.

To the inner side of one of the cultivator-gangs is bolted or otherwise secured a bracket member 8. This bracket member may be located in any desired position and has in this instance been shown as applied to the casting 6 of the right-hand cultivator-gang 4. It is obvious that when this casting is not present the bracket member 8 may be attached in any other suitable position—such as, for instance, to the inner cultivator-beam of one of the gangs. The bracket member 8 serves to pivotally support a beam 9, which is the supporting-beam of my improved weeding attachment. The latter embodies in its construction a transversely-disposed horizontally-slotted bar 10, upon the upper side of which is swiveled a bracket 11, which is pivotally connected with the rear end of the beam 9 by means of a transverse bolt 12. The front end of the bracket 11 is provided with a plurality of transverse perforations 13, any one of which may be connected, by means of a bolt 14, with the beam 9, which is provided with a single perforation for the passage of said connecting-bolt. It will be seen that by this means the tooth-bar may be adjusted at various degrees of inclination to the supporting-beam 9, so that the teeth connected with the said beam may be given either a forward or a rearward slant, or they may be set in a vertical position, according to the conditions under which the work is to be performed.

The teeth 15 are connected with the horizontally-slotted tooth-bar 10 by means of eyebolts 16. Said teeth may be set against the front or the rear side of the bar, or some may be set against the front side and others against the rear side, the latter arrangement being sometimes found preferable, especially when the ground is lumpy and clods are to be broken up by the action of the device.

The tooth-bar 10 is provided with an upwardly-extending bracket 17, connected by a brace 18 with one of a series of perforations 19 in the supporting-beam 9. It has been already stated that the tooth-bar 10 is connected with the bracket 11 by a swivel-joint, which permits the said tooth-bar to turn in a horizontal plane, and it is thus capable of being adjusted at any desired angle horizontally with relation to the supporting-beam 9 by shifting the brace 18 from one to another of the perforations 19. This adjustment is an important feature of my invention, inasmuch as it enables stalks, weeds, and other trash to be guided to one side of the row, where it will be left clear of the young plants.

Pivotally connected with the bracket member 8 at a suitable distance above the supporting-beam 9 is a foot-lever 20, which is provided with a pivoted spring-actuated dog or pawl 21, engaging a rack-segment 22, which is formed upon the bracket member 8 at the upper end of the latter. The pawl or dog 21 may be actuated by the foot of the operator when he places his foot upon the treadle 20ª at the rear end of the lever 20 for the purpose of adjusting the latter. The front end of the supporting-beam is connected by a spring 25 with the front beam of the foot-lever 20, the tension of said spring being exerted to throw the front ends of said members in the direction of each other. A post 23, secured to the supporting-beam 9 a few inches from its front end, is bifurcated at its upper end, as shown at 24, to engage the foot-lever 20, which plays in said bifurcation. Now inasmuch as the lever member 20 is normally secured in position by means of the dog or pawl 21 engaging the ratchet member 22, it follows that the tension of the spring will be normally exerted to depress the rear end of the beam 9, which carries the tooth-bar 10, thus depressing the latter and holding the teeth or tines with which it is provided in the ground to an extent which is determined by the position of the foot-lever 20. In passing it may be said that the teeth or tines 15, which in the accompanying drawings have been shown to be straight, are not necessarily so, but may be bent or curved in any desired manner which may be found to increase the efficiency of their action.

By the construction and arrangement of parts thus far shown the working parts of the device—namely, the tooth-bar and its related parts—may be conveniently depressed, so as to cause the teeth to enter the ground to any desired depth. This is accomplished by simply disengaging the spring-actuated catch 21 from the rack-segment 22 and depressing the rear end of the foot-lever, when the connecting-spring 25 will lift the front end of the tooth-carrying bar. By lifting the rear end of the foot-lever its front end will be depressed, thus engaging the bifurcated post 23 and causing the depression of the front end of the tooth-carrying beam, thereby raising the teeth at the rear end of said beam. By this means the said teeth may be conveniently regulated. In order, however, to throw the teeth entirely out of the ground, as will be required when the machine is to be transported from place to place, I have provided such means for lifting the working part of the device, the same consisting of a hand-lever 26, pivotally connected with a rack-segment 27, which is suitably clamped upon the axle of the cultivator by means of a clip 28. The hand-lever 26 is provided with a suitably-operated lock-dog engaging the teeth of the rack-segment, and said hand-lever is extended forwardly and is connected with the front end of the hand-lever by means of a spring 29, one end of which is connected direct to the front end of the foot-lever and the other end of which is connected with the hand-lever by a short chain-section 30. A chain 31 connects the hand-lever 26 in rear of its fulcrum with the supporting-beam 9 at a point close to the rear end of the latter, in the present instance to the bolt 12, which connects the swiveled bracket 11 of the tooth-bar with said supporting-beam.

It will be seen that by the construction herein shown and described the weeding attachment is practically disposed between the cultivator-gangs, so that the teeth or tines 15 will operate very closely to the spears of corn and serve to stir the soil and to remove any weeds that may be growing very closely to the ground, and also to remove from contact with the latter any soil lumps, or clods that, in spite of the presence of the shields 7, which form a part of the cultivator, may have been thrown against the young plants. It will be easily seen that by operating the foot-lever by downward pressure upon its rear end the spring 25 will be strained, elevating the front end of the supporting-beam 9, and thus forcing the tooth-bar and its related parts in a downward direction. The slant of the tooth-bar vertically as well as horizontally will have been previously adjusted by the means provided for the purpose. In case obstructions should be encountered the supporting-beam will swing upon the pivot, whereby it is connected with the bracket member 8, and the spring 25 will yield to the pressure, thus permitting the teeth or tines to pass the obstruction without injury to themselves or to other parts of the device. When the cultivator-gangs are raised from the ground by means provided for the purpose, it is obvious that my improved attachment will be simultaneously raised from the ground, owing to the permanent connection of the bracket-member 8 with one of the cultivator-gangs. In case, however, it should be desired to raise the operating parts of my improved weeder attachment independently of the cultivator-gangs this may be instantly accomplished by means of the hand-lever 26, by means of which the rear end of the supporting-beam 9 may be raised against the tension of the spring 25. When this condition is attained, the dog or pawl of the foot-lever may be released, thus causing the front end of the said foot-lever to be tilted in a downward direction by the tensile connection of the spring 25.

My improved cultivator attachment, as will be seen from the foregoing, is simple in construction and will be found efficient in operation. The cost of manufacture is not excessive, and it may be readily attached to any riding-cultivator of ordinary construction, as will be readily understood.

Under some circumstances it may be thought necessary or desirable to slightly modify the construction of the device, and I reserve the right to any such modifications as may be resorted to within the scope of my invention and without detracting from the spirit or sacrificing the utility of the same.

Having thus described my invention, I claim—

1. In a device of the class described, a pivotally-mounted supporting-beam, a tooth-carrying bar connected with the rear end of said supporting-beam, and spring means for elevating the front end of the latter.

2. In a device of the class described, a pivotally-mounted supporting-beam, a tooth-carrying bar connected with the rear end of the latter, spring means for forcing the front end of said supporting-beam in an upward direction, and means for regulating the tension of such spring means.

3. In a device of the class described, a supporting-beam, a weeding attachment at the rear end of the same, a foot-lever mounted pivotally above the supporting-beam, a guide-post connected with the supporting-beam near its front end and having a forked end engaging the foot-lever, a spring having its ends connected with said supporting-beam, a foot-lever, and means for retaining the latter in adjusted position.

4. In a device of the class described, a bracket member having a rack-segment, a supporting-beam pivotally connected with said bracket member, a weeding attachment at the rear end of said beam, a foot-lever connected pivotally with the bracket member above the beam, a dog pivotally connected with the foot-lever and engaging the rack-segment of the bracket member, and spring-connecting means between the front ends of the foot-lever and the supporting-beam.

5. In a device of the class described, a pivotally-mounted supporting-beam carrying a weeder attachment at its rear end, a foot-lever pivoted above the supporting-beam, means for retaining said foot-lever in adjusted position, a spring connection between the front ends of the foot-lever and the supporting-beam, and means for raising the rear end of the supporting-beam independently of the foot-lever and against the tension of the spring connecting the latter with said supporting-beam.

6. In a device of the class described, a pivotally-mounted supporting-beam, a weeder attachment at the rear end of the same, a foot-lever disposed above said supporting-beam, a spring connection between the front ends of said lever and supporting-beam, means for retaining the foot-lever in adjusted position, a hand-lever fulcrumed at a fixed point independent of the supporting means of the foot-lever and supporting-beam, a spring connection between the front end of said hand-lever and the front end of the foot-lever, and connecting means between the rear end of the supporting-beam and the hand-lever in rear of the fulcrum of the latter.

7. In a device of the class described, a pivotally-mounted supporting-beam, a tooth-carrying bar constituting a weeder attachment at the rear end of said supporting-beam, a foot-lever mounted above the latter, a spring connection between the front ends of said supporting-beam and foot-lever, a hand-lever fulcrumed at a fixed point above the supporting means of the supporting-beam and foot-lever, a spring connection between the front end of said hand-lever and the front end of the foot-lever, a chain connection between the rear end of the supporting-beam and the hand-lever, and means for retaining the hand-lever in adjusted position.

In testimony that I claim the foregoing as my own I have hereto affixed my signature in the presence of two witnesses.

RICHARD TITUS.

Witnesses:
FRANK W. DUNN,
WM. KELLER.